United States Patent
Skibba et al.

(10) Patent No.: US 10,202,203 B2
(45) Date of Patent: Feb. 12, 2019

(54) FUEL TANK TUBE BONDING TAB

(71) Applicant: Textron Innovations Inc., Providence, RI (US)

(72) Inventors: Richard A. Skibba, Wichita, KS (US); M. Scott Montgomery, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 381 days.

(21) Appl. No.: 15/097,951

(22) Filed: Apr. 13, 2016

(65) Prior Publication Data

US 2016/0318624 A1 Nov. 3, 2016

Related U.S. Application Data

(60) Provisional application No. 62/148,416, filed on Apr. 16, 2015.

(51) Int. Cl.
*B64D 45/02* (2006.01)
*B64D 37/32* (2006.01)

(52) U.S. Cl.
CPC ............. *B64D 45/02* (2013.01); *B64D 37/32* (2013.01)

(58) Field of Classification Search
CPC .................. H05F 3/00–3/02; B64D 45/02
See application file for complete search history.

(56) References Cited

U.S. PATENT DOCUMENTS

| | | | |
|---|---|---|---|
| 2,423,222 A * | 7/1947 | Berry | F16L 3/1233 174/40 CC |
| 3,246,144 A | 4/1966 | Beall et al. | |
| 3,353,145 A * | 11/1967 | Sodderland | H01R 4/60 24/278 |
| 3,891,290 A * | 6/1975 | Marshall | F16L 19/0218 174/78 |
| 4,210,374 A * | 7/1980 | Churla | H01R 4/60 285/404 |
| 4,456,321 A * | 6/1984 | Jones | H01R 4/2445 439/395 |
| 5,103,609 A * | 4/1992 | Thoreson | A62C 2/065 52/232 |
| 5,164,545 A * | 11/1992 | Kreinberg | H01R 4/26 174/78 |
| 7,122,739 B2 * | 10/2006 | Franks, Jr. | H01R 4/643 174/51 |
| 7,770,848 B2 | 8/2010 | Johnson et al. | |
| 2009/0140106 A1* | 6/2009 | Johnson | F16L 3/1207 248/55 |
| 2012/0225571 A1* | 9/2012 | Shapiro | H01R 4/66 439/108 |
| 2013/0087238 A1* | 4/2013 | Mercier | F16L 3/26 138/118.1 |
| 2013/0133943 A1* | 5/2013 | Smith | H01R 4/64 174/665 |

* cited by examiner

*Primary Examiner* — Ronald W Leja
*Assistant Examiner* — Christopher Clark
(74) *Attorney, Agent, or Firm* — Erise IP, P.A.

(57) ABSTRACT

Disclosed are systems and methods for grounding insulated P-clamps used to secure fuel conduits. To do so, one end of the device is adapted to be secured between the flanges of the P-clamp, and a second end is adapted to extend into the clamp to make electrical contact with the conduit. The device creates an electrical path to the grounded structure to which the clamp is secured.

15 Claims, 4 Drawing Sheets

FUEL TANK TUBE BONDING TAB

CROSS-REFERENCE TO RELATED APPLICATIONS

This Application claims priority to U.S. Provisional Application No. 62/148,416 filed Apr. 16, 2015, the disclosure of which is incorporated herein by reference in its entirety.

TECHNICAL FIELD

The following disclosure relates generally to devices and systems for cushioned clamps that secure an object to a separate structure while electrically grounding the object to the separate structure.

BACKGROUND

Clamps are widely used in aircraft as well as numerous other applications for attaching a tube/conduit to a support member. Normally the support and tube/conduit are constructed of metal.

Some of these clamps are referred to as "P-clamps" because they have the cross-sectional shape of a clamp that is shaped like the letter "P." An example of a conventional P-clamp is shown in FIG. 1. As can be seen in the figure, the clamp 100 includes a looping body 102 which is used to secure the tube. Body 102 is clamped about the tube (not shown) when an upper flange 104 is brought together with a lower flange 106. The flanges 104 and 106 are integral with the metal spine 108 of the loop portion 102. The metal spine 104 is included in a flexible protective covering 110. The covering is provided so that the metal will not damage the tubing. Although the covering 110 protects the tube from mechanical damage, it also acts as an insulator. Thus, electrical charges developed or induced in the tubing are not discharged, which can create sparks creating a fire hazard.

Conventional systems for dealing with charge buildup within aircraft fuel tank systems has typically involved either bulky and complicated bond strap arrangements or expensive conductive couplings. Bond strap installations create maintenance difficulties when tubing must be inspected or replaced, and have failure modes which create potential ignition sources when exposed to the effects of lightning. In particular, improper installation or vibration and fretting of bond straps can result in frayed elements that can act as ignition sources under certain conditions.

U.S. Patent Application Publication No. 2012/0225571 made by Shapiro is not a P-clamp, but instead, uses two fasteners to secure a padded metal piece to a structure in order to secure a tube. Shapiro discloses a metal comb structure which acts as a static drain.

SUMMARY

Various objects, features, aspects and advantages of the inventive subject matter will become more apparent from the following detailed description of preferred embodiments, along with the accompanying drawings in which like numerals represent like components.

The contents of this summary section are provided only as a simplified introduction to the disclosure, and are not intended to be used to limit the scope of the appended claims.

One embodiment includes a clamp for supporting a conduit within an aircraft structure. The clamp has an internally insulated loop portion, a first flange at a first end, and a second flange at a second end. The loop defines a receiving area for the conduit, and the first and second flanges can be opened to allow for the receipt of the conduit into the receiving area of the clamp. A tab is interposed between the first and second flanges and extends into the receiving area to engage the conduit. The tab makes an electrical connection between the conduit and a supporting grounding structure. The tab also has an upwardly curved portion which aids engagement with the conduit to ensure the electrical connection is made. The clamp has an internally insulated loop portion is constructed of a metal spine that is included within an insulating material.

In embodiments, the electrical connection made is enhanced by a portion of the tab that is bent under the second flange. More specifically, the tab has a tab flange which is sandwiched between the first and second flanges when engaged, and the tab flange has a laterally extending portion that is wrapped under the tab flange at about 180 degrees and in a perpendicular direction relative to the tab, the wrapped-under portion being sandwiched between a lower surface of the second tab, and the supporting grounding structure upon installation.

In embodiments, alignable holes are defined into all of the first flange, second flange, tab flange, and wrapped-under portion such that a fastener can be received there through into the supporting grounding structure.

In another embodiment, a device is used to create an electrical pathway between a conduit clamped to a grounded structure, wherein the device includes a conductive flexible body; a first end configured to be securable between the first and second flanges; and a second end of the conduit makes electrical contact with the conduit. In some embodiments, the first end has a portion that is bent under the second flange to be in electrical contact with the supporting grounding structure when installed.

In some embodiments, the body of the device, as it extends from the first end towards the second end ramps upward into a plateau portion. Further, the body, at the second end, may transition into an upwardly extending tail that terminates at an upwardly extending edge.

In some embodiments, the first end has a laterally extending portion that is wrapped under first end to be between a lower surface of the second tab, and the supporting grounded structure upon installation.

The device may, in embodiments, have a conductive flexible body is made of metal, e.g., Aluminum. In some embodiments, the device can be constructed of "O" condition Aluminum.

In other embodiments, a method enables a user to ground a substantially insulated P-clamp to a grounded structure to which the P-clamp is being fastened, the P-clamp having first and second flanges. The method involves providing a device such that the device is fastenable between the first and second flanges, and also, when installed, will extend in to make electrical contact with the conduit and form an electrical path to the grounded structure. In some embodiments, an end of the device curves upward to increase engagement with the conduit.

In some arrangements, the device is preinstalled onto the P-clamp before delivery to a consumer. In other arrangements, the device is provided as a retrofit for use with clamps already installed in the field.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

This disclosure relates to a clamp used to secure a tube, hose, conduit, or other like device. In an exemplary embodiment, the clamp is located proximate a fuel tank or within other structural spaces of an aircraft where it is necessary to bond fuel or hydraulic lines to the aircraft structure where it is ideal to eliminate electrical arc sources when exposed to electrical charges, e.g., resulting from the buildup of static electricity or with lightning strikes.

In the interest of avoiding fuel line and/or fuel tank explosions, it is desirable to: (1) reduce the probability of ignition sources occurring around the fuel lines, and (2) reducing the flammability of the fuel tanks.

It is critical to aircraft safety to address the prevention of possible sources of ignition in airplane fuel tanks. Certain fuel tank system design features have been identified that can result in a degradation of the safety features of airplane fuel tank systems. These include: 1) poorly conducting pipe couplings that may become electrical arc sources when exposed to electric currents, including lightning currents; 2) static bonds on fuel system plumbing connections inside the fuel tank worn due to mechanical wear of the plumbing from wing movement and corrosion, 3) loose or intermittent contacts between bond straps and conductive components; and 4) the selection of improper insulating materials in connector design resulting in degrading of the material because of contact with the fuel that is used to cool and lubricate the pump motor.

Figure 1:
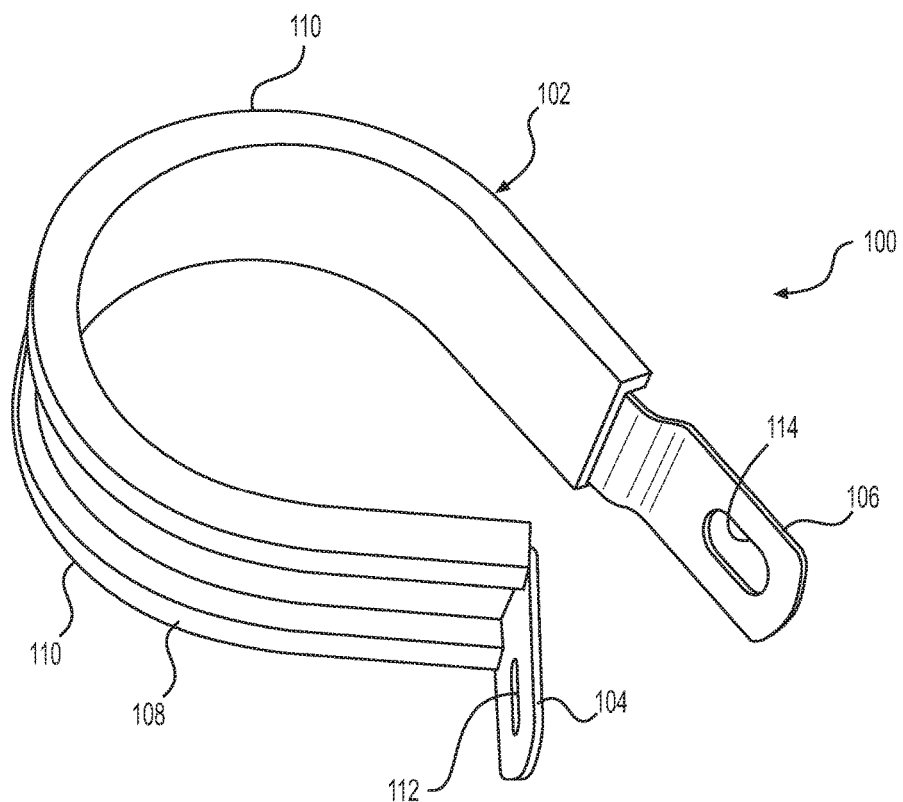
FIG. 1 shows a perspective view of a prior-art Clamp.
Figure 2:
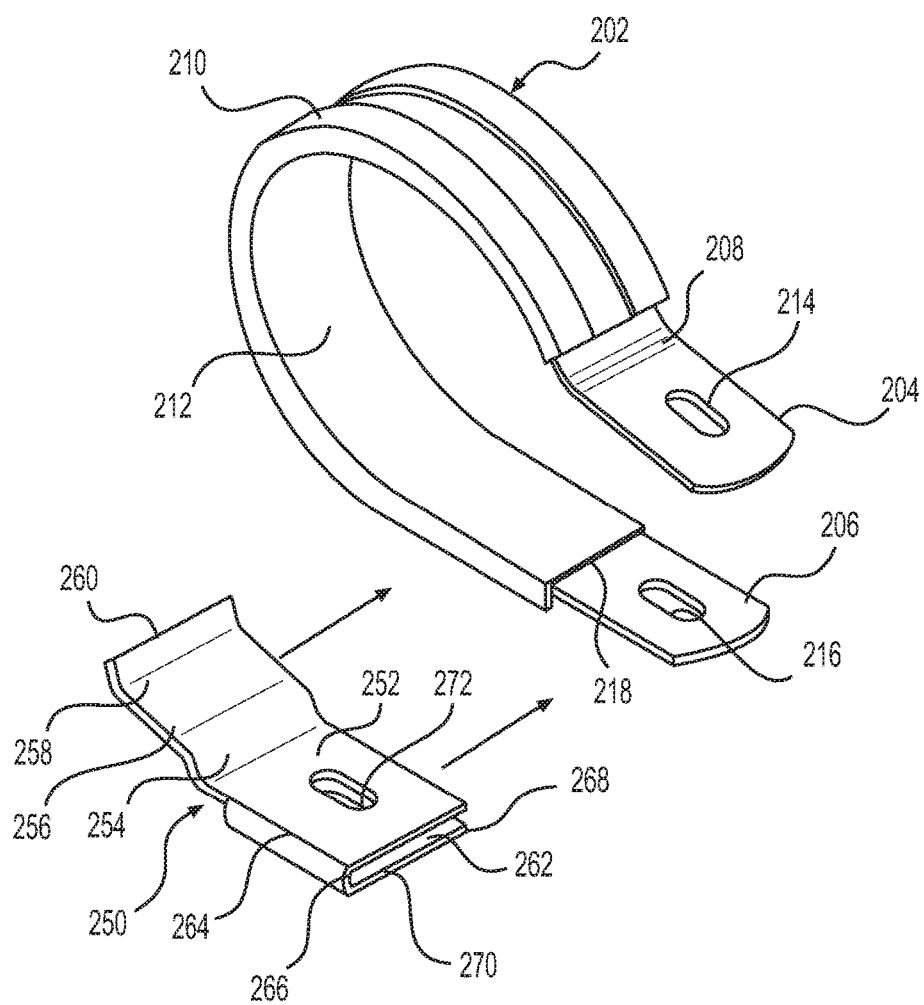
FIG. 2 is a perspective view of an embodiment of a P-clamp with a bonding tab inserted into the pocket.
Figure 3:
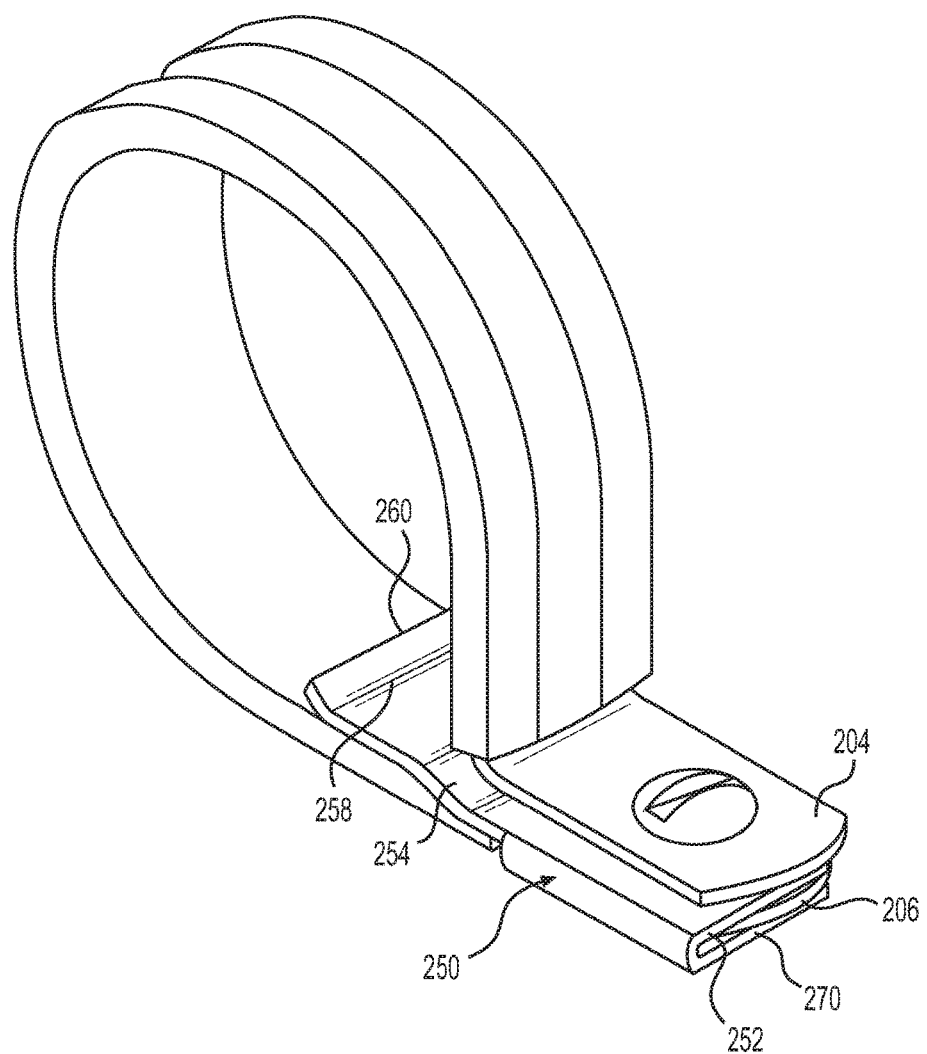
FIG. 3 shows an embodiment of the clamp secured together with the conduit removed.
Figure 4:
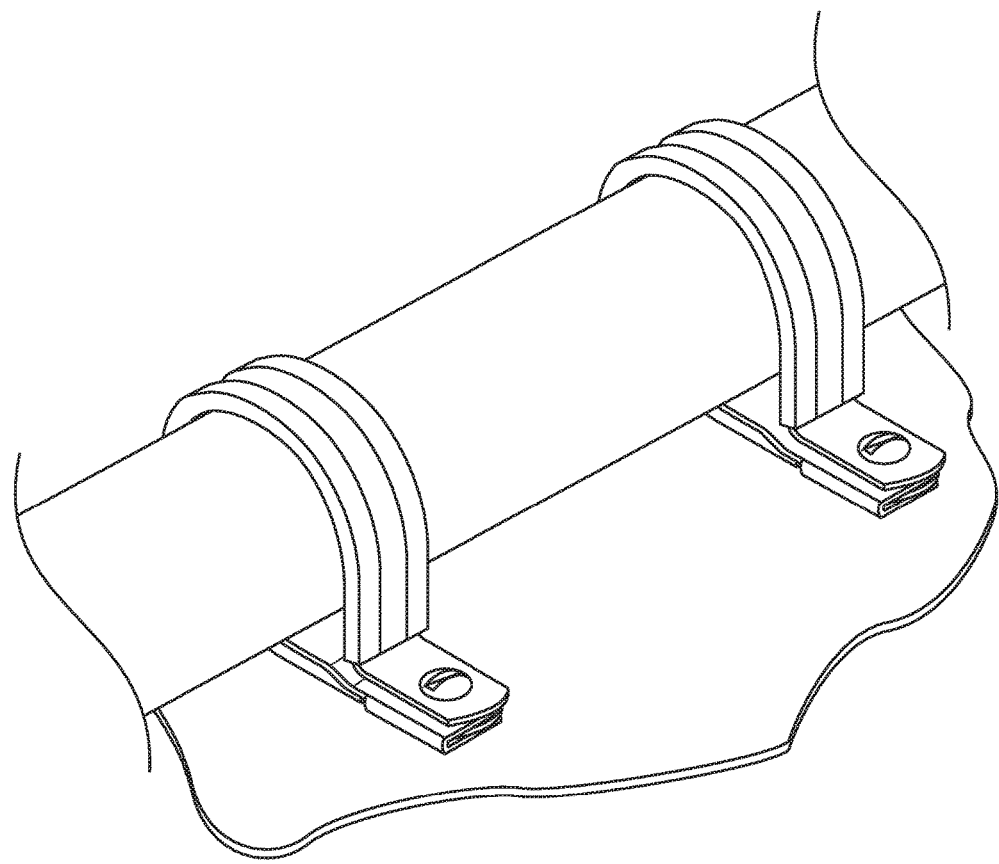
FIG. 4 shows two clamps, like the one shown in FIGS. 2-3, used to secure a conduit.

The disclosed arrangement shown in FIGS. 2-4 provides a bonding system that delivers continuity of the electrical path to prevent arcing due to, e.g., static charge buildup, or even conducting lightning currents. In an embodiment, a clamp provides a conductive pipe coupling so that static buildup in the tube is drained through the clamp so that arcing is avoided do either to static buildup, or lightning. The arrangement disclosed herein also avoids mechanical wear, chafing, and/or rupturing of the tube created by wing movement or corrosion. The arrangement uses a conductive tab that is installed along with the P-clamp fastening process, and once installed meets the objectives discussed above.

Also, aside from concerns regarding static electricity, all aircraft are required to establish the ability to safely withstand the effects of a lightning strike. An ignition source may occur if sufficient current passing through an airframe reaches a small gap between metal parts and jumps across the gap. Yet because of well-developed protection systems, U.S. airliners have established an exemplary lightning protection record. Nevertheless, amended ignition prevention requirements have resulted in the need for additional means of fuel system lightning protection redundancy.

There are a variety of fuel line clamp configurations that may employed in an airframe. In an exemplary embodiment, a clamp located within a fuel tank or within other structural spaces of an aircraft and is used for bonding fuel or hydraulic lines to the aircraft structure to eliminate electrical arc sources when exposed to electric currents such as static electricity buildup, or a lightning strike.

Static electrical buildup can result from the transmission of fuel through the conduit. This is because the relative movement of the fuel against the inside walls of the conduit results in electrons leaving the fuel and aligning themselves with the conduit. Since the conduit is ordinarily partially isolated, there is a reduced flow of electrons back and forth between the conduit and other conductive/grounding structures in the environment.

The amended ignition prevention requirements at 14 CFR § 25.981(a)(3) require consideration of factors such as aging, wear, corrosion and maintenance errors as well as the existence of single failures, combinations of failures not shown to be extremely improbable, and single failures in combination with latent failures to account for the cause of many potential ignition sources in fuel tanks. The amendment to 14 CFR § 25.981, which applies to the fuel tank system, requires the designs be protected from lightning with failure tolerant features.

It is also important to recognize that as a fuel line passes through traditional clamps there can be mechanical wear or chaffing of the fuel line at the clamp from wing movement and corrosion. This is generally remedied by coating the inner circumference of the clamp with a polymer of some variety to prevent metal to metal contact that over time could rupture a fuel line. However, placing a polymeric coating on the interior circumference of the clamp destroys electrical connectivity to the airframe, necessitating reliance on couplings as a bond path or isolator, and resulting in higher system cost.

The disclosed arrangement provides a mounting system for supporting tubing within aircraft (particularly tubing within aircraft fuel tanks) including a thin, flexible, conductive, layer of material on the interior surface of the mounting system that is in direct contact with the tubing. The thin conductive layer of material completes an electrical bond/grounding path from the tubing to the structure to which the mounting system is attached. The thin conductive layer is of sufficient area and conductivity to withstand conducted currents from lightning striking the aircraft. The mounting system may be a simple tube clamp.

For example, with reference to an embodiment of the system shown in FIG. 2, a clamp portion 200 is configured to utilize a bonding tab 250. Clamp portion 200 includes a loop body 202 which is used to secure the tube. Body 202 is clamped about a conduit, tube, or hose (not shown) when an upper flange 204 is brought together with a lower flange 206. The flanges 204 and 206 are integral with a spine 208 of the loop portion 202, and all are constructed of metal. The metal spine 208 is included in a flexible protective covering 210. The covering is provided so that the metal will not damage the tubing. Although the covering 210 protects the tube from mechanical damage, it also acts as an electrical insulator. Thus, static charges developing in the tubing would not ordinarily be discharged through the covering 210 into the framework of the aircraft.

The FIG. 2 embodiment, however, also includes a bonding tab 250. The bonding tab 250 is fabricated from a conductive material having appreciable flexibility. This is because the tab will need to provide conductivity, but also not damage the integrity of the metal (e.g., Aluminum) tube. Fuel line tubing typically includes an anticorrosive chemical film coating, and the tab flexibility also is desirable in that it prevents compromising the film.

In embodiments, the tab ideally is annealed to have a relatively high ductility temper. In an embodiment, the tab is constructed of a soft "O" condition Aluminum, also known as "O" annealed, or "O" temper Aluminum. Alternatively, it is possible that other moderately less flexible forms of processed Aluminum could be used, as well as other conductive metals having desired ductility and electrical conductivity.

It should also be understood that the desired ductility can be achieved as a function of rigidity versus thickness. For example, an artisan desiring to use a material annealed to have a higher rigidity might be used, and made to be more flexible by thinning it out.

An embodiment of the tab 250 includes a flange portion 252, and then ramps upward at a portion 254 into a plateau portion 256. The tab 250 then transitions into an upwardly extending tail 258, and terminates at an edge 260.

From the flange portion 252, a folded under/wrapped-under portion 262, which would otherwise extend outward, is instead brought back 180 degrees underneath the flange portion 252 making a first fold 264 and a second fold 266 and then terminating at an edge 268. This arrangement results in two substantially parallel surfaces, and a space 270 is created between the underside of the flange 252 and the wrapped under portion 262. To facilitate installation, a hole 272 exists in the flange 252 along with a reciprocating hole (not completely shown) in the wrapped under portion 262 which will be used to receive a fastener (not shown) through both.

Functionally speaking, the folded under portion 262 of the tab serves to (i) sandwich the clamp flange to keep the tab from falling while installing the clamp and inserting the retaining bolt, and (ii) act as an anti-rotation feature to prevent the tab from rotating away from the tube during installation or clamp vibration.

A process for installing the clamp 210 and tab 250 is as follows. First, the tab 250 is slid laterally onto the loop body as shown in FIG. 2. More specifically, the lower loop flange 206 is received into the space 270 created between tab flange 252 and the wrapped under portion 262. Ramped portion 254 is designed to accommodate a raised edge 218. Next, the conduit (not shown) is received through and between the flanges 204 and 206 (which can be flexed apart) into the receiving area defined by an interior surface 212 of the covering 210. Once secured inside the looped portion, the loop 210 tab 250 combination is secured to a support member (normally a metal ground) on the frame of an aircraft or other device. More specifically, a fastener (not shown, but could be a bolt, rivet, metal screw, or other such device) is received through hole 214, then through hole 272, then through hole 216, and then through the lower hole (barely visible in FIG. 2, but is sized like and aligned with hole 272 above it) in the wrapped under portion 262, and then finally into the metal frame of the aircraft.

Once installed, plateau portion 256 of the tab will be in electrical contact with the conduit, tube, hose, or whatever the device is that is being secured. The raised nature of the upwardly-extending tail 258 ensures contact because the compression created when the conduit is received will cause it to flexion against the conduit, preventing the possibility of a gap being created between the conduit and the loop 210. Because it is in electrical contact with the conduit, any static electrical buildup will be discharged since wrapped-under portion 262 will be in electrical engagement with the aircraft frame. Thus, the likelihood of sparking is all but eliminated, reducing the risk of fire.

Although the installation process of the tab 250 into the clamp portion 200 is made according to the processes above, it is possible that the tab could be preinstalled on the clamp portion 200 using a conductive adhesive, some form of welding, or some other means. In other words, the tab would be adhered premarket.

In other embodiments, the tabs could be provided as a retrofit device to be incorporated into clamps (like clamps 100 and 200) that have already been installed. Regardless, the process of installation would be the same as described above, except that the existing clamp would have to be removed to enable the mechanical installation of the tab, or alternatively, the application of adhesive and then installation.

Further still, the tab 250, in embodiments, could be prefabricated as an integral part of one or both of the flanges 204 or 206.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

We claim:

1. A clamp for supporting conduit within an aircraft structure, the clamp comprising:
    an internally insulated loop portion and a first flange at a first end, and a second flange at a second end;
    a receiving area defined by the loop portion, the clamp allowing for the first and second flanges being opened to allow for the passage of the conduit through the first and second flanges and into the receiving area;
    a tab interposed between the first and second flanges and extending into the receiving area;
    the first and second flanges being engagable, and when engaged, sandwiching at least a portion of the tab and making an electrical connection through the tab between the conduit and a supporting grounding structure; and
    wherein the tab has a tab flange which is sandwiched between the first and second flanges when engaged, and the tab flange has a laterally extending portion that is wrapped under the tab flange in a substantially parallel direction relative to the tab flange, the wrapped-under portion being sandwiched between a lower surface of the second flange and the supporting grounding structure upon installation.

2. The clamp of claim 1 wherein the tab has an upwardly curved portion which aids engagement with the conduit to ensure the electrical connection is made.

3. The clamp of claim 1 wherein the internally insulated loop portion is constructed of a metal spine that is included within an insulating material.

4. The clamp of claim 3 wherein the material is a polymer.

5. The clamp of claim 1 wherein alignable holes are defined in all of the first flange, second flange, tab flange, and wrapped-under portion such that a fastener can be received there through into the supporting grounding structure.

6. A device for use in creating an electrical pathway between a conduit clamped to a grounded structure using a clamp, the clamp having an internally-insulated loop portion, a first flange at a first end of the clamp, and a second flange at a second end of the clamp, the loop portion defining a receiving area for the conduit and alignable apertures through the first and second flanges used to secure the clamp and conduit to the grounded structure, the device comprising:
- a conductive flexible body;
- a first end of the body configured to be securable between the first and second flanges;
- the body configured to extend into the receiving area such that, if the device is installed, a second end of the body makes electrical contact with the conduit; and
- wherein the first end of the body is sandwiched between the first and second flanges when engaged, and the first end of the body also has a laterally extending portion that is wrapped under the first end of the body to be between a lower surface of the second flange and the grounded structure upon installation.

7. The device of claim 6 wherein the body of the device, as it extends from the first end towards the second end, ramps upward into a plateau portion.

8. The device of claim 7 wherein the body, at the second end, transitions into an upwardly extending tail that terminates at an upwardly extending edge.

9. The device of claim 6 wherein alignable holes are defined in all of the first flange, second flange, first end of the body, and wrapped-under portion such that a fastener can be received there through into the grounded structure.

10. The device of claim 6 wherein the conductive flexible body is made of metal.

11. The device of claim 10 wherein the conductive flexible body is constructed of Aluminum.

12. The device of claim 11 wherein the conductive flexible body is constructed of "O" condition Aluminum.

13. A method of enabling a user of a substantially insulated P-clamp to create a ground path between a conduit to be secured in the P-clamp and a grounded structure to which the P-clamp is being fastened using first and second flanges of the P-clamp, the method comprising:
- sandwiching a portion of a device between the first and second flanges; and
- extending the device to form a longitudinally extended portion such that the device will make electrical contact with the conduit and form an electrical path to the grounded structure; and
- laterally projecting a section of the portion of the device that is sandwiched between the first and second flanges, and then folding the section thus configured the section to be foldable underneath the second flange and above the grounded structure to (i) secure the device to the second flange during installation, and (ii) act as an anti-rotation feature to prevent the longitudinally-extended portion of the device from rotating away from the tube during installation or clamp vibration.

14. The method of claim 13 comprising:
preinstalling the device onto the P-clamp before delivering the P-clamp to the user.

15. The method of claim 13 comprising:
providing the device as a retrofit to be incorporated into P-clamps already installed in the field.

* * * * *